United States Patent
Ueda

(10) Patent No.: US 10,249,909 B2
(45) Date of Patent: Apr. 2, 2019

(54) NONAQUEOUS ELECTROLYTE SECONDARY BATTERY AND METHOD FOR MANUFACTURING THE SAME

(71) Applicant: Sanyo Electric Co., Ltd., Daito-shi, Osaka (JP)

(72) Inventor: Atsushi Ueda, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 138 days.

(21) Appl. No.: 15/126,415

(22) PCT Filed: Mar. 18, 2015

(86) PCT No.: PCT/JP2015/001505
§ 371 (c)(1),
(2) Date: Sep. 15, 2016

(87) PCT Pub. No.: WO2015/146076
PCT Pub. Date: Oct. 1, 2015

(65) Prior Publication Data
US 2017/0084958 A1  Mar. 23, 2017

(30) Foreign Application Priority Data

Mar. 27, 2014 (JP) ................. 2014-065182

(51) Int. Cl.
*H01M 10/00* (2006.01)
*H01M 10/0587* (2010.01)
(Continued)

(52) U.S. Cl.
CPC ..... *H01M 10/0587* (2013.01); *H01M 2/1673* (2013.01); *H01M 10/049* (2013.01); *H01M 10/0431* (2013.01)

(58) Field of Classification Search
CPC .......... H01M 2/1673; H01M 10/0431; H01M 10/049; H01M 10/0587
See application file for complete search history.

(56) References Cited

U.S. PATENT DOCUMENTS 6,187,471 B1 * 2/2001 McDermott ............ H01M 6/32
429/110
6,506,514 B1 1/2003 Endo et al.
(Continued)

FOREIGN PATENT DOCUMENTS

| | | |
|---|---|---|
| JP | 5-47419 A | 2/1993 |
| JP | 6-150971 | 5/1994 |

(Continued)

OTHER PUBLICATIONS

International Search Report dated Jun. 23, 2015, issued in counterpart International Application No. PCT/JP2015/001505 (2 pages).

*Primary Examiner* — Cynthia H Kelly
*Assistant Examiner* — Monique M Wills
(74) *Attorney, Agent, or Firm* — Westerman, Hattori, Daniels & Adrian, LLP

(57) ABSTRACT

A nonaqueous electrolyte secondary battery including an electrode assembly the electrode assembly being fastened with a rectangular or square fixing tape applied to cover the end of the coil, the side of the fixing tape in contact with the electrode assembly including self-adhesive portions having a pressure-sensitive adhesive and a non-adhesive portion having no pressure-sensitive adhesive, the self-adhesive portions being disposed at both ends of the non-adhesive portion in the direction of the width of the fixing tape so that the non-adhesive portion is interposed between the self-adhesive portions, the battery satisfying $0.9 \leq Wb/Wa \leq 1$ and $0.35 \leq Wc/Wa \leq 0.8$ wherein Wa is the height of the electrode (Continued)

assembly, Wb is the width of the fixing tape and Wc is the width of the non-adhesive portion.

4 Claims, 2 Drawing Sheets

(51) Int. Cl.
*H01M 2/16* (2006.01)
*H01M 10/04* (2006.01)

(56) References Cited

U.S. PATENT DOCUMENTS

2013/0232773 A1* 9/2013 Mineya ............... H01M 2/1673
  29/623.5
2014/0065377 A1* 3/2014 Horvath ..................... C09J 7/04
  428/193

FOREIGN PATENT DOCUMENTS

| JP | 9-161814 A | 6/1997 |
| JP | 2001-155774 | 6/2001 |
| JP | 2002-124293 | 4/2002 |
| JP | 2005-243336 | 9/2005 |
| JP | 2006-302801 A | 11/2006 |
| JP | 2009-117290 | 5/2009 |
| JP | 2010-212227 A | 9/2010 |

* cited by examiner

Figure 2
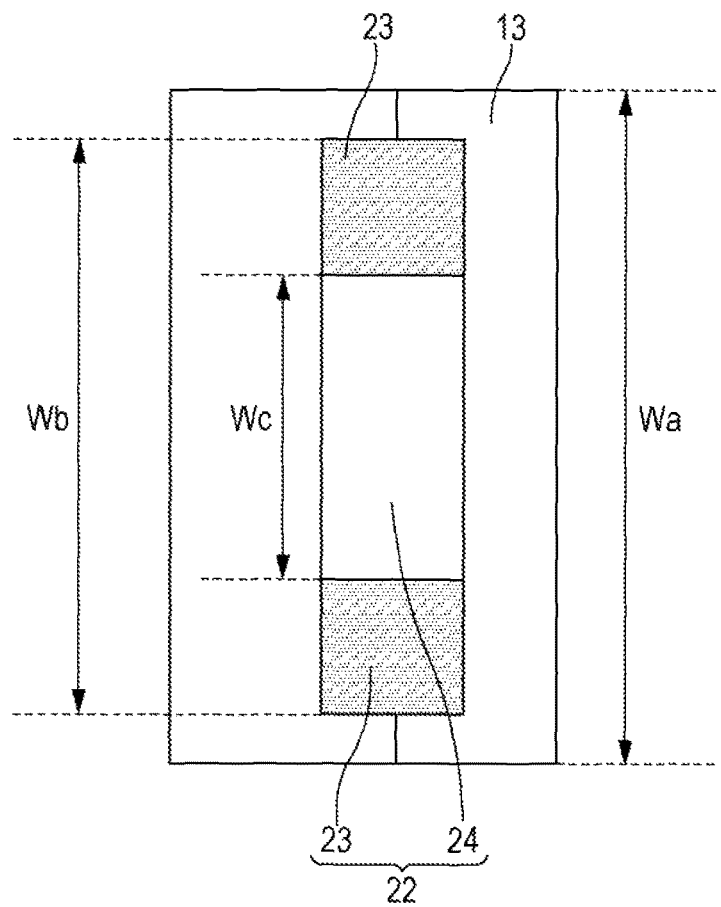
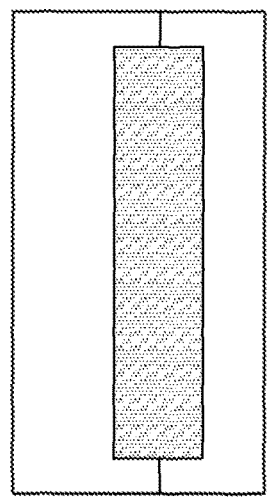
Figure 3(a)
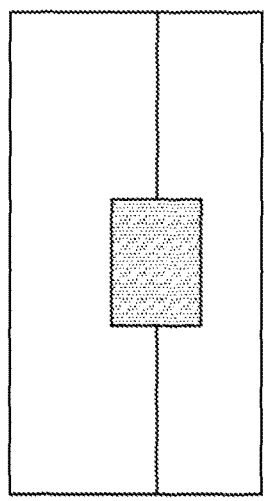
Figure 3(b)
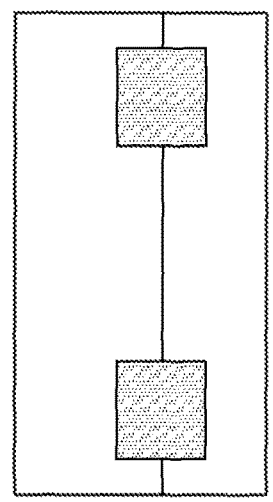
Figure 3(c)

NONAQUEOUS ELECTROLYTE SECONDARY BATTERY AND METHOD FOR MANUFACTURING THE SAME

TECHNICAL FIELD

The present invention relates to a nonaqueous electrolyte secondary battery in which an electrode assembly is prevented from damages caused when the electrode assembly is inserted into a battery case and in which the ease for the electrode assembly to be impregnated with an electrolytic solution is improved, and to a method for manufacturing such batteries.

BACKGROUND ART

Nonaqueous electrolyte secondary batteries are categorized into cylindrical batteries, prismatic batteries and pouch batteries according to the shape of battery cases. Electrode assemblies accommodated into battery cases are divided into the wound type and the stack type. A wound electrode assembly is fabricated by winding a positive electrode plate and a negative electrode plate together via a separator and fixing the end of the coil to the body of the electrode assembly with a fixing tape. The electrode assembly is then accommodated into a battery case, and an electrolytic solution is poured. Thereafter, the open end of the battery case is sealed to form a nonaqueous electrolyte secondary battery. In nonaqueous electrolyte secondary batteries, the time required for the penetration of an electrolytic solution varies depending on the configuration of an electrode assembly. Thus, the ease for an electrode assembly to be impregnated with an electrolytic solution is considered as a factor that has a significant influence on the productivity of nonaqueous electrolyte secondary batteries.

In recent years, the increasing demand for a higher capacity of nonaqueous electrolyte secondary batteries has resulted in an increase in the density in which components such as active materials and a separator are loaded into electrode assemblies. This trend has made it difficult for the electrode assembly to be impregnated with an electrolytic solution speedily. Further, the swelling of electrode plates during charging causes a separator to be pressed against the electrode plates, sometimes resulting in a voltage failure in which the voltage is decreased after the charging.

Patent Literature 1 discloses a method for manufacturing batteries in which the inside of a battery case accommodating an electrode assembly is pressurized to a prescribed pressure before the pouring of an electrolytic solution and is depressurized to atmospheric pressure. According to the disclosure, the pressurization and depressurization before the pouring of an electrolytic solution allow the electrode assembly to be impregnated with the electrolytic solution speedily.

Patent Literature 2 discloses a wound secondary battery in which the end of an electrode assembly is fixed to the body of the coil with a self-adhesive tape having a pressure-sensitive adhesive only on portions of a substrate. This self-adhesive tape is applied to the electrode assembly so that the adhesive-free portion will cover the end of the coil. According to the disclosure, the electrode assembly is impregnated with an electrolytic solution that has entered through the end of the coil.

Patent Literature 3 discloses a nonaqueous electrolyte battery in which an electrode assembly is fastened with a fixing tape which has dots of a pressure-sensitive adhesive scattered on a substrate of the tape. In this nonaqueous electrolyte battery, the regions of the fixing tape that are free from the pressure-sensitive adhesive are impregnated with an electrolytic solution quickly and the fixing tape comes off from the electrode assembly with the result that the electrode assembly is relaxed. According to the disclosure, the occurrence of a voltage failure is prevented by virtue of this action even in the case where the electrode assembly is highly loaded.

CITATION LIST

Patent Literature

PTL 1: Japanese Published Unexamined Patent Application No. 2010-212227
PTL 2: Japanese Published Unexamined Patent Application Mo. 2006-302801
PTL 3: Japanese Published Unexamined Patent Application No. 9-161814

SUMMARY OF INVENTION

Technical Problem

The battery manufacturing method described in Patent Literature 1 will be effective in terms of quick impregnation of an electrode assembly with an electrolytic solution. When, however, the method is applied to the manufacturing of batteries having an electrode assembly whose end of the coil is fastened with a fixing tape, the effect of the manufacturing method is not fully attained at times.

In the wound secondary battery described in Patent Literature 2, the self-adhesive tape is attached in such a manner that the pressure-sensitive adhesive does not overlap the end of the coil of the electrode assembly. In this configuration, the self-adhesive tape has to be applied over an increased area along the direction in which the electrode assembly is wound in order to make it sure that the end of the coil will be reliably fixed to the body of the electrode assembly. Applying the self-adhesive tape over an increased area results in an increase in the outer diameter of the electrode assembly and sometimes makes the insertion of the electrode assembly into a battery case difficult.

Although Patent Literature 3 describes that the fixing tape used in the nonaqueous electrolyte battery is impregnated with an electrolytic solution at the regions that are free from the pressure-sensitive adhesive, the technique does not consider the ease for the electrode assembly to be impregnated with the electrolytic solution.

Solution to Problem

The present invention pertains to a nonaqueous electrolyte secondary battery including an electrode assembly and a battery case accommodating the electrode assembly, the electrode assembly including a positive electrode plate having a positive electrode active material layer disposed on a positive electrode current collector and a negative electrode plate having a negative electrode active material layer disposed on a negative electrode current collector, the positive electrode plate and the negative electrode plate being wound together into a coil through a separator, the electrode assembly being fastened with a rectangular or square fixing tape applied to cover the end of the coil, the side of the fixing tape in contact with the electrode assembly including self-adhesive portions having a pressure-sensitive adhesive and a non-adhesive portion having no pressure-sensitive adhesive, the self-adhesive portions being disposed at both ends of the non-adhesive portion in the direction of the width of the fixing tape wherein the direction of the width of the fixing tape is the direction of the height of the electrode assembly, the battery satisfying $0.9 \leq Wb/Wa \leq 1.05$ and $0.35 \leq Wc/Wa \leq 0.85$ wherein Wa is the height of the electrode assembly, Wb is the width of the fixing tape and Wc is the width of the non-adhesive portion.

In the invention, it is preferable that either of the positive electrode plate and the negative electrode plate be disposed on the outermost circumference of the electrode assembly, and a portion of the outermost electrode plate opposed to the inner surface of the battery case be defined by a portion of the current collector exposed from the active material layer.

A method for manufacturing the nonaqueous electrolyte secondary battery according to the invention preferably includes performing at least once a step of pressurizing the inside of the battery case accommodating the electrode assembly to above atmospheric pressure before pouring of a nonaqueous electrolytic solution and releasing the pressure to atmospheric pressure.

Advantageous Effects of Invention

According to the present invention, an electrode assembly is prevented from damages caused when the electrode assembly is inserted into a battery case and the ease for the electrode assembly to be impregnated with an electrolytic solution is improved. Thus, the productivity of nonaqueous electrolyte secondary batteries may be enhanced.

BRIEF DESCRIPTION OF DRAWINGS

FIG. 2 is a plan view of an electrode assembly fastened with a fixing tape having a non-adhesive portion.

FIG. 3 is a set of plan views of electrode assemblies fastened with a fixing tape without a non-adhesive portion.

DESCRIPTION OF EMBODIMENTS

Figure 1:
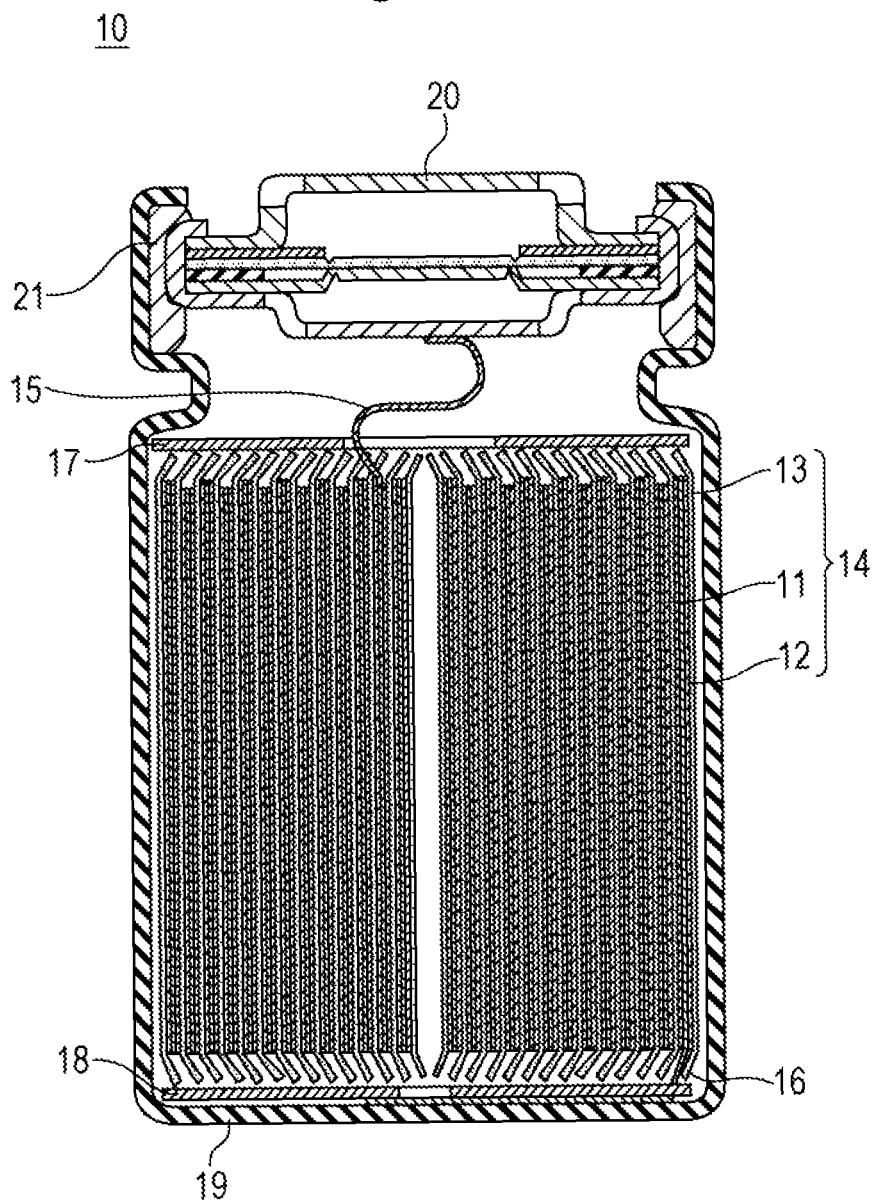
FIG. 1 is a sectional view of a nonaqueous electrolyte secondary battery used in Experimental Group 1.

Embodiments of the present invention will be described in detail based on a cylindrical nonaqueous electrolyte secondary battery illustrated in FIG. 1. The scope of the invention is not limited to the embodiments presented below.

The positive electrode plate is fabricated by forming a positive electrode active material layer on a positive electrode current collector. The positive electrode active material layer may be formed by applying a slurry mixture prepared by kneading a positive electrode active material, a binder, a conductive agent and a dispersion medium together onto a positive electrode current collector, followed by drying and compressing.

Examples of the materials of the positive electrode current collectors include aluminum, aluminum alloys, stainless steel, titanium and titanium alloys. In particular, aluminum and aluminum alloys are preferable as the materials of the positive electrode current collectors because they are resistant to dissolution into electrolytic solutions.

Examples of the positive electrode active materials include lithium transition metal composite oxides including lithium and at least one selected from cobalt, manganese, nickel, chromium, iron and vanadium.

In the invention, it is particularly preferable to use a lithium nickel composite oxide as the positive electrode active material. Lithium nickel composite oxides have a higher capacity and are less expensive as compared to lithium cobalt composite oxides, and are therefore suited for the manufacturing of nonaqueous electrolyte secondary batteries having a high energy density. However, active material layers including lithium nickel composite oxides need to be formed with a higher density than when lithium cobalt composite oxides are used. Consequently, electrode assemblies using a lithium nickel composite oxide as the positive electrode active material are frequently difficult to impregnate with an electrolytic solution sufficiently. The present invention can provide improved ease for the electrode assembly to be impregnated with an electrolytic-solution, and thus makes it possible to manufacture high-capacity nonaqueous electrolyte secondary batteries with high productivity.

The negative electrode plate is fabricated by forming a negative electrode active material layer on a negative electrode current collector. The negative electrode active material layer may be formed by applying a slurry mixture prepared by kneading a negative electrode active material, a binder and a dispersion medium together onto a negative electrode current collector, followed by drying and compressing. Where necessary, a conductive agent may be added to the mixture.

Examples of the materials of the negative electrode current collectors include copper, copper alloys, nickel, nickel alloys, stainless steel, aluminum and aluminum alloys. In particular, copper, copper alloys, nickel and nickel alloys are preferable as the materials of the negative electrode current collectors because they are resistant to dissolution into electrolytic solutions.

Examples of the negative electrode active materials include carbon materials such as graphite materials, for example, natural graphites and artificial graphites, non-graphitizable carbons and graphitizable carbons, metal materials such as silicon and tin, and metal oxide materials such as silicon oxide and tin oxide.

The separator may be a microporous film including a polyolefin material. A microporous film using a combination of a polyolefin material and a heat resistant material may also be used. Examples of the polyolefin microporous films include those monolayer or multilayer microporous films including at least one of polyethylene, polypropylene and ethylene-propylene copolymer. Examples of the heat resistant materials include heat resistant resins such as aramid, polyimide and polyamidimide, and inorganic fillers such as inorganic oxides.

The nonaqueous electrolytic solution is prepared by dissolving a lithium salt as an electrolyte salt into a nonaqueous solvent. The nonaqueous solvent is preferably a mixed solvent of a cyclic carbonate and a chain carbonate. Examples of the cyclic: carbonates include ethylene carbonate, propylene carbonate, butylene carbonate and fluoroethylene carbonate. Examples of the chain carbonates include dimethyl carbonate, diethyl carbonate and ethyl methyl carbonate. At least, one of $LiPF_6$, $LiBF_4$ and $LiClO_4$ may be used as the lithium salt.

The fixing tape may be one composed of a substrate and a pressure-sensitive adhesive. Examples of the materials of the substrates include polyolefins such as polyethylene, polypropylene, polyvinyl chloride and ethylene-vinyl acetate copolymer, polyesters such as polyethylene terephthalate, polybutylene terephthalate and polyethylene naphthalate, polyarylates, polyurethanes, polycarbonates, polyamides, polyimides, polyphenylene sulfides and polyethylene tetrafluorides. A composite including two or more kinds of these exemplary materials may be used as the substrate.

Examples of the materials of the pressure-sensitive adhesives in the fixing tape include rubber pressure-sensitive adhesives, acrylic pressure-sensitive adhesives and silicone pressure-sensitive adhesives.

In the invention, the inside of the battery case accommodating the electrode assembly is temporarily pressurized from atmospheric pressure to a prescribed pressure before the pouring of the electrolytic solution. The upper limit in the pressure is not particularly limited, but is preferably in the range of 0.2 to 2 MPa. In this step, the increased pressure is released to atmospheric pressure. This pressure release may be performed in such a manner that after the inside of the battery case has been pressurized, the pressure is reduced to below atmospheric pressure and then released to atmospheric pressure. The pressurization and depressurization are preferably performed by placing the workpiece, which contains the electrode assembly but is not filled with the electrolytic solution yet, into a closable box and increasing or reducing the pressure inside the box. In this manner, a pressure may be applied to the electrode assembly without causing a deformation of the battery case.

Next, embodiments of the invention will be described in more detail based on Examples presented below. The scope of the invention is not limited to Examples described below.

Experimental Group 1

Examples 1-1 to 1-5

Fabrication of Positive Electrode Plate

Into N-methylpyrrolidone as a dispersion medium were added 100 parts by mass of $LiNi_{0.8}Co_{0.15}Al_{0.05}O_2$ as a positive electrode active material, 1.7 parts by mass of polyvinylidene fluoride as a binder and 2.5 parts by mass of acetylene black as a conductive agent. The mixture was kneaded together so that the materials would be uniformly dispersed. Thus, a positive electrode mixture in the form of a slurry was prepared. The positive electrode mixture was applied to both sides of a positive electrode current collector including a 15 μm thick aluminum foil. The coated foil was dried, compressed and cut to a prescribed size. This positive electrode plate 11 was 573 mm in length, 57 mm in width and 163 μm in thickness. A portion of the positive electrode plate 11 remained uncoated with the positive electrode mixture and was thus defined by a portion of the current collector exposed, and a positive electrode lead 15 made of aluminum was connected to this exposed portion of the current collector. A positive electrode plate 11 was thus fabricated.

(Fabrication of Negative Electrode Plate)

Into water as a dispersion medium were added 100 parts by mass of graphitizable carbon as a negative electrode active material, 0.6 parts by mass of polyvinylidene fluoride as a binder and 1 part by mass of carboxymethyl cellulose as a thickener. The mixture was kneaded together so that the materials would be uniformly dispersed. Thus, a negative electrode mixture in the form of a slurry was prepared. The negative electrode mixture was applied to both sides of a negative electrode current collector including a 10 μm thick copper foil. The coated foil was dried, compressed and cut to a prescribed size. This negative electrode plate 12 was 658 mm in length, 58.5 mm in width and 164 μm Id thickness. A portion of the negative electrode plate 12 remained uncoated with the negative electrode mixture and was thus defined by a portion of the current collector exposed, and a negative electrode lead 16 made of nickel was connected to this exposed portion of the current collector. A negative electrode plate 12 was thus fabricated.

(Fabrication of Electrode Assembly)

The positive electrode plate 11 and the negative electrode plate 12 fabricated above were wound together via a separator 13 composed of 20 μm thick polyethylene microporous films. A fixing tape 22 was applied to the end of the coil. An electrode assembly 14 was thus fabricated. The separator 13 was on the outermost circumference of the electrode assembly 14.

As illustrated in FIG. 2, the side of the fixing tape 22 applied in contact with the electrode assembly 14 includes self-adhesive portions 23 having a pressure-sensitive adhesive and a non-adhesive portion 24 having no pressure-sensitive adhesive. The self-adhesive portions 23 are disposed at both ends of the non-adhesive portion 24 in the width direction. Examples 1-1 to 1-5 involved fixing tapes 22 which had the values of Wb/Wa and Wc/Wa described in Table 1. Here, Wa is the height of the electrode assembly 14, Wb the width of the fixing tape 22, and Wc the width of the non-adhesive portion 24. The height Wa of the electrode assembly 14 is the same in Examples 1-1 to 1-5. The height of the electrode assembly 14 corresponds to the length of the electrode assembly 14 in the direction of the axis of the coil.

(Fabrication of Unfilled Workpiece)

A circular lower insulating plate 18 including polypropylene was placed between the electrode assembly 14 and the negative electrode lead 16. With an automated device, the electrode assembly 14 was inserted into a battery case 19 and thereafter the negative electrode lead 16 was connected to the bottom of the battery case 19. Next, a circular upper insulating plate 17 including polypropylene was placed on the electrode assembly 14 and thereafter the positive electrode lead 15 was connected to a sealing member 20. A workpiece not filled with an electrolytic solution yet was thus fabricated.

(Preparation of Nonaqueous Electrolytic Solution)

A nonaqueous electrolytic solution was prepared by dissolving $LiPF_6$ as an electrolyte salt into a mixed solvent, including ethylene carbonate, diethyl carbonate and ethyl methyl carbonate with a concentration of 1.0 mol/L.

(Pouring of Nonaqueous Electrolytic Solution)

The electrolytic solution was poured under the following conditions. First, under atmospheric pressure, 2 ml of the electrolytic solution was poured into the unfilled workpiece. The air in the inside of the electrode assembly accommodated in the workpiece was evacuated by reducing the pressure to vacuum. These operations were repeated three times, and the total of 6 ml of the electrolytic solution was poured.

(Fixation of Sealing Member by Crimping)

After the electrolytic solution poured had completely impregnated the inside of the electrode assembly 14, the open end of the battery case 13 was crimped together with the sealing member 20 via a gasket 21. In the manner described hereinabove, cylindrical nonaqueous electrolyte secondary batteries 10 of Examples 1-1 to 1-5 were fabricated. The batteries were 18 mm in diameter and 65 mm in height.

Comparative Examples 1-1 to 1-3

Nonaqueous electrolyte secondary batteries 10 of Comparative Examples 1-1 to 1-3 were fabricated while replacing the fixing tape 22 in Example 1-1 by one having the values of Wb/Wa and Wc/Wa described in Table 1. The value of Wa was the same as in Example 1-1.

Comparative Examples 1-4 to 1-6

Nonaqueous electrolyte secondary batteries 10 of Comparative Examples 1-4 to 1-6 were fabricated while replacing the fixing tape 22 in Example 1-1 by one having a self-adhesive portion over the entirety of one side. In Comparative Examples 1-4, 1-5 and 1-6, the fixing tape 22 was applied to cover the end of the coil of the electrode assembly 14 as illustrated in FIGS. 3(a), (b) and (c), respectively. The width of the tape in Comparative Example 1-4 was the same as in Example 1-1, and the widths of the tape in Comparative Examples 1-5 and 1-6 were 30% and 40%, respectively, of the width of the tape in Comparative Example 1-4.

TABLE 1

|  | Wb/Wa | Wc/Wa |
|---|---|---|
| Ex. 1-1 | 1 | 0.6 |
| Ex. 1-2 | 0.95 | 0.6 |
| Ex. 1-3 | 0.9 | 0.6 |
| Comp. Ex. 1-1 | 0.85 | 0.6 |
| Comp. Ex. 1-2 | 0.8 | 0.6 |
| Ex. 1-4 | 0.9 | 0.5 |
| Ex. 1-5 | 0.9 | 0.35 |
| Comp. Ex. 1-3 | 0.9 | 0.3 |

(Evaluation of Damages on Electrode Assemblies)

The following inspection was made to evaluate damages on the electrode assembly 14 caused when the electrode assembly 14 had been inserted into the battery case 19 with an automated device. The electrode assembly 14 was removed from the unfilled workpiece and was visually inspected for damages on the outermost circumference of the electrode assembly 14. The electrode assembly 14 was judged as damaged when the outermost circumference of the electrode assembly had been ruptured. In each of Examples and Comparative Examples, one hundred workpieces were visually inspected for damages on the electrode assembly 14. Table 2 describes the number of damaged electrode assemblies in each of Examples and Comparative Examples.

(Evaluation of Ease in Impregnation with Electrolytic Solution)

The ease for the electrode assembly 14 to be impregnated with the electrolytic solution was evaluated in the following manner. During the pouring process, the time was measured after the pressure of the workpiece was released to atmospheric pressure after the completion of the third vacuuming, until the liquid level of the electrolytic solution remaining on the top surface of the electrode assembly 14 became no longer visible. The time thus measured was obtained as the electrolyte impregnation time and was used as an indicator of the ease for the electrode assembly to be impregnated with the electrolytic solution. The impregnation time was measured with respect to fifty workpieces in each of Examples and Comparative Examples. Table 2 describes the average values calculated from the measurement results.

TABLE 2

|  | Number of damaged electrode assemblies | Electrolyte impregnation time (sec) |
|---|---|---|
| Ex. 1-1 | 0/100 | 125 |
| Ex. 1-2 | 0/100 | 123 |
| Ex. 1-3 | 0/100 | 123 |
| Comp. Ex. 1-1 | 1/100 | 121 |
| Comp. Ex. 1-2 | 3/100 | 121 |
| Ex. 1-4 | 0/100 | 125 |
| Ex. 1-5 | 0/100 | 126 |
| Comp. Ex. 1-3 | 0/100 | 183 |
| Comp. Ex. 1-4 | 0/100 | 190 |
| Comp. Ex. 1-5 | 13/100 | 120 |
| Comp. Ex. 1-6 | 12/100 | 125 |

The results described in Table 2 show that Examples 1-1 to 1-5 achieved a significant reduction in electrolyte impregnation time as compared to Comparative Example 1-4. This indicates that the use of the fixing tape 22 having the non-adhesive portion 24 in a region of the tape improves the ease in impregnation with the electrolytic solution. While Comparative Examples 1-5 and 1-6 involved the fixing tapes 22 without any non-adhesive portion 24 similarly to Comparative Example 1-4, the electrolyte impregnation time obtained in these cases was similar to that obtained in Examples 1-1 to 1-5. Although the reduction in the width of the fixing tape improved the ease in impregnation with the electrolytic solution, such a simple approach alone was incapable of preventing damages on the electrode assembly 14. Comparative Examples 1-1 to 1-3 involved the fixing tapes 22 having the non-adhesive portion 24. The electrode assembly 14 was damaged in Comparative Examples 1-1 and 1-2, and was not sufficiently impregnated with the electrolytic solution in Comparative Example 1-3. These results have shown that Wb/Wa is preferably not less than 0.9 in order to prevent damages on the electrode assembly 14, and Wc/Wa is preferably not less than 0.35 to improve the ease in impregnation with the electrolytic solution. In view of the fact that the height of the fixing tape 22 preferably does not far exceed that of the electrode assembly 14, Wb/Wa is preferably not more than 1.05, and more preferably not more than 1. To ensure that the end of the coil will be reliably fastened to the body of the electrode assembly, Wc/Wa is preferably not more than 0.85, and more preferably not more than 0.8.

Experimental Group 2

Examples 2-1 to 2-5 and Comparative Examples 2-1 to 2-6

Nonaqueous electrolyte secondary batteries of Examples 2-1 to 2-5 and Comparative Examples 2-1 to 2-6 were fabricated in the same manner as in Experimental Group 1, except that a negative electrode plate 12 having no active material layer on the outer circumferential side was disposed on the outermost circumference of the electrode assembly. Examples 2-1 to 2-5 and Comparative Examples 2-1 to 2-6 correspond to Examples 1-1 to 1-5 and Comparative Examples 1-1 to 1-6, respectively.

In Examples 2-1 to 2-5 and Comparative Examples 2-1 to 2-6, damages on the electrode assemblies, and the ease in impregnation with the electrolytic solution were evaluated in the same manner as in Experimental Group 1. The results are described in Table 3.

TABLE 3

|  | Number of damaged electrode assemblies | Electrolyte impregnation time (sec) |
| --- | --- | --- |
| Ex. 2-1 | 0/100 | 156 |
| Ex. 2-2 | 0/100 | 154 |
| Ex. 2-3 | 0/100 | 152 |
| Comp. Ex. 2-1 | 9/100 | 150 |
| Comp. Ex. 2-2 | 15/100 | 151 |
| Ex. 2-4 | 0/100 | 153 |
| Ex. 2-5 | 0/100 | 154 |
| Comp. Ex. 2-3 | 0/100 | 245 |
| Comp. Ex. 2-4 | 0/100 | 250 |
| Comp. Ex. 2-5 | 35/100 | 150 |
| Comp. Ex. 2-6 | 38/100 | 156 |

The comparison of the numbers of damaged electrode assemblies described in Table 3 and Table 2 shows that the occurrence of damages on the electrode assemblies is more frequent in Experimental Group 2 in which the outermost circumference of the electrode assembly was the negative electrode plate having the current collector exposed on its outer circumferential side, in place of the separator. The reason for this result is probably because the negative electrode current collector is more prone to damages by contact with the battery case than the separator. In contrast, no electrode assemblies were damaged in Examples 2-1 to 2-5 and it has been demonstrated that the present invention attains marked effects when a negative electrode plate having a portion of a current collector exposed on the outer circumferential side is disposed on the outermost circumference of the electrode assembly. Similar effects will be obtained also when a positive electrode plate is disposed on the outermost circumference of the electrode assembly. From the comparison of the electrolyte impregnation time described in Table 3 and Table 2, the impregnation time is longer in Experimental Group 2 on the whole. While the reduction in impregnation time was approximately 34% in Example 1-1 relative to Comparative Example 1-4 in Experimental Group 1, Example 2-1 in Experimental Group 2 attained approximately 38% reduction in impregnation time compared to Comparative Example 2-4. Thus, advantageous effects are attained also in terms of the ease in impregnation with the electrolytic solution in the case where the electrode assembly is configured so that the outermost circumference thereof is defined by a negative electrode plate which has a portion of a current collector exposed on its outer circumferential side.

Experimental Group 3

Examples 3-1 to 3-5 and Comparative Examples 3-1 to 3-6

Nonaqueous electrolyte secondary batteries of Examples 3-1 to 3-5 and Comparative Examples 3-1 to 3-6 were fabricated in the same manner as in Experimental Group 2, except that before the pouring of the electrolytic solution, the battery case containing the electrode assembly was subjected to three cycles of a step in which the inside pressure of the case was increased to 0.8 MPa and was thereafter released to atmospheric pressure. Examples 3-1 to 3-5 and Comparative Examples 3-1 to 3-6 correspond to Examples 2-1 to 2-5 and Comparative Examples 2-1 to 2-6, respectively.

In Examples 3-1 to 3-5 and Comparative Examples 3-1 to 3-6, the ease in impregnation with the electrolytic solution was evaluated in the same manner as in Experimental Group 2. The results are described in Table 4.

TABLE 4

|  | Electrolyte impregnation time (sec) |
| --- | --- |
| Ex. 3-1 | 104 |
| Ex. 3-2 | 102 |
| Ex. 3-3 | 101 |
| Comp. Ex. 3-1 | 98 |
| Comp. Ex. 3-2 | 99 |
| Ex. 3-4 | 102 |
| Ex. 3-5 | 104 |
| Comp. Ex. 3-3 | 233 |
| Comp. Ex. 3-4 | 240 |
| Comp. Ex. 3-5 | 140 |
| Comp. Ex. 3-6 | 103 |

The comparison of the electrolyte impregnation time described in Table 4 and Table 3 shows that the ease in impregnation with the electrolytic solution was markedly enhanced in Experimental Group 3 in which the unfilled battery case containing the electrode assembly was subjected to three cycles of a step in which the inside pressure was increased from atmospheric pressure to 0.8 MPa and was thereafter released to atmospheric pressure. In particular, the pressurization and depressurization of the inside of the battery case produced marked effects when the fixing tape according to the invention was used similarly to Examples 1-1 to 1-5. The reason for this result is probably because the use of the fixing tape according to the present invention allows the electrode assembly wound with a high density to be relaxed easily.

While Examples presented above have illustrated in detail some embodiments of the invention with respect to cylindrical nonaqueous electrolyte secondary batteries, the range of batteries to which the present, invention is applied is not limited to cylindrical batteries and includes all types of nonaqueous electrolyte batteries having a wound electrode assembly.

INDUSTRIAL APPLICABILITY

The present invention is applicable not only to power sources for driving mobile devices such as cellular phones and notebook computers, but also to power sources for other devices such as electric tools, electric vehicles (EVs) and electricity storage systems, thus achieving great utility in industry.

REFERENCE SIGNS LIST

10 NONAQUEOUS ELECTROLYTE SECONDARY BATTERY
11 POSITIVE ELECTRODE PLATE
12 NEGATIVE ELECTRODE PLATE
13 SEPARATOR
14 ELECTRODE ASSEMBLY
19 BATTERY CASE
22 FIXING TAPE
23 SELF-ADHESIVE PORTION
24 NON-ADHESIVE PORTION

The invention claimed is:
1. A nonaqueous electrolyte secondary battery comprising an electrode assembly and a battery case accommodating the electrode assembly, the electrode assembly including a positive electrode plate having a positive electrode active material layer disposed on a positive electrode current collector and a negative electrode plate having a negative electrode active material layer disposed on a negative electrode current collector, the positive electrode plate and the negative electrode plate being wound together into a coil through a separator, the electrode assembly being fastened with a rectangular or square fixing tape applied to cover the end of the coil,
- wherein the fixing tape includes a substrate, and a pressure-sensitive adhesive disposed on the substrate,
- the side of the fixing tape in contact with the electrode assembly including self-adhesive portions having the pressure-sensitive adhesive and a non-adhesive portion not having the pressure-sensitive adhesive,
- the self-adhesive portions being disposed at both ends of the non-adhesive portion in the direction of the width of the fixing tape wherein the direction of the width of the fixing tape is the direction of the height of the electrode assembly,
- the battery satisfying $0.9 \leq Wb/Wa \leq 1.05$ and $0.35 \leq Wc/Wa \leq 0.85$ wherein Wa is the height of the electrode assembly, Wb is the width of the fixing tape and Wc is the width of the non-adhesive portion.

2. The nonaqueous electrolyte secondary battery according to claim 1, wherein either of the positive electrode plate and the negative electrode plate is disposed on the outermost circumference of the electrode assembly, and a portion of the outermost electrode plate opposed to the inner surface of the battery case is defined by a portion of the current collector exposed from the active material layer.

3. A method for manufacturing the nonaqueous electrolyte secondary battery described in claim 1, comprising performing at least once a step of pressurizing the inside of the battery case accommodating the electrode assembly to above atmospheric pressure before pouring of a nonaqueous electrolytic solution and releasing the pressure to atmospheric pressure.

4. A method for manufacturing the nonaqueous electrolyte secondary battery described in claim 2, comprising performing at least once a step of pressurizing the inside of the battery case accommodating the electrode assembly to above atmospheric pressure before pouring of a nonaqueous electrolytic solution and releasing the pressure to atmospheric pressure.

* * * * *